United States Patent
Uwano et al.

(10) Patent No.: US 7,639,984 B2
(45) Date of Patent: Dec. 29, 2009

(54) WIRELESS COMMUNICATION SYSTEM

(75) Inventors: Koki Uwano, Fujisawa (JP); Masanori Taira, Yokohama (JP); Kenzaburo Fujishima, Kokubunji (JP); Mikio Kuwahara, Hachiouji (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 693 days.

(21) Appl. No.: 11/350,111

(22) Filed: Feb. 9, 2006

(65) Prior Publication Data
US 2006/0217158 A1    Sep. 28, 2006

(30) Foreign Application Priority Data
Mar. 22, 2005    (JP)    ............... 2005-081930

(51) Int. Cl.
*H04B 1/00*    (2006.01)
(52) U.S. Cl. ................ 455/63.1; 455/554.1; 455/554.2; 455/561; 455/63.2; 455/63.4
(58) Field of Classification Search ............. 455/554.1, 455/63.2
See application file for complete search history.

(56) References Cited
FOREIGN PATENT DOCUMENTS

| | | |
|---|---|---|
| CN | 1356793 A | 7/2002 |
| CN | 1437420 A | 8/2003 |
| JP | 2002-232350 | 8/2002 |
| JP | A-2003-235072 | 8/2003 |
| JP | 2003-304577 | 10/2003 |
| JP | 2003-338803 | 11/2003 |
| JP | 2004-304394 | 10/2004 |
| JP | 2005-159849 | 6/2005 |

OTHER PUBLICATIONS

Kuwabara Mikio, JP2004-304394, Oct. 28, 2004, English translation.*

* cited by examiner

*Primary Examiner*—Yuwen Pan
(74) *Attorney, Agent, or Firm*—Antonelli, Terry, Stout & Kraus, LLP.

(57) ABSTRACT

A wireless communication which suppresses radio interference between wireless base stations and improves the channel efficiency is implemented. In the wireless communication system including a central base station, a plurality of remote base stations having a direction-variable antenna, and a plurality of mobile stations to communicate with the remote base stations, the central base station performs centralized management of radio-wave beam patterns to be sent to the plurality of mobile stations which will communicate with remote base stations and performs packet scheduling of the mobile stations in such a manner that radio waves sent from the remote base stations will not cause strong interference at the mobile stations.

9 Claims, 18 Drawing Sheets

| MOBILE STATION ID | BASE STATION ID | AREA ID | PRIORITY LEVEL |
|---|---|---|---|
| 2-1 | 4-1 | ⑥ | 4 |
| 2-2 | 4-1 | ⑦ | 1 |
| 2-3 | 4-2 | ⑨ | 5 |
| 2-4 | 4-2 | ⑫ | 6 |
| 2-5 | 4-3 | ② | 2 |
| 2-6 | 4-3 | ④ | 3 |

FIG.13

| BASE STATION ID | AREA ID | INTERFERENCE AREA 1 | | INTERFERENCE AREA 2 | | INTERFERENCE AREA 3 | |
|---|---|---|---|---|---|---|---|
| | | BASE STATION ID | AREA ID | BASE STATION ID | AREA ID | BASE STATION ID | AREA ID |
| 4-1 | ⑥ | 4-2 | ⑪ | 4-2 | ⑫ | 4-3 | ② |
| 4-1 | ⑦ | 4-2 | ⑪ | 4-3 | ① | 4-3 | ② |
| 4-2 | ⑨ | 4-3 | ③ | 4-3 | ④ | — | — |
| 4-2 | ⑫ | 4-1 | ⑤ | 4-1 | ⑥ | — | — |
| 4-3 | ② | 4-1 | ⑦ | 4-1 | ⑧ | 4-2 | ⑩ |
| 4-3 | ④ | 4-2 | ⑨ | 4-2 | ⑩ | — | — |

FIG.14

①~⑫ : AREA NUMBERS

| MOBILE STATION ID | INTERFERENCE AREA 1 | | INTERFERENCE AREA 2 | | INTERFERENCE AREA 3 | |
|---|---|---|---|---|---|---|
| | BASE STATION ID | AREA ID | BASE STATION ID | AREA ID | BASE STATION ID | AREA ID |
| 2-1 | 4-2 | ⑪ | — | — | — | — |
| 2-2 | 4-2 | ⑪ | 4-3 | ② | — | — |
| 2-3 | 4-3 | ③ | 4-3 | ④ | — | — |
| 2-4 | 4-1 | ⑤ | — | — | — | — |
| 2-5 | 4-1 | ⑦ | 4-1 | ⑧ | 4-2 | ⑩ |
| 2-6 | 4-2 | ⑨ | 4-2 | ⑩ | — | — |

FIG.18

WIRELESS COMMUNICATION SYSTEM

BACKGROUND OF THE INVENTION

1. Field of the Invention

The present invention relates to wireless communication systems, and more specifically, to a wireless communication system which includes a plurality of cells and is suited for suppressing radio interference from adjacent base stations.

2. Description of the Related Art

In a CDMA cellular system, the base stations of adjacent cells use radio waves in the same frequency band. Radio interference can occur between those cells. The degree of interference depends on the propagation environment and the positional relationship between the base stations. Interference provides an insufficient signal-to-interference (S/I) ratio, and high-speed data transmission becomes impossible sometimes. Accordingly, stable communication must be established by increasing the processing gain, using a modulation system having a high degree of noise immunity, such as BPSK, or the like. A sufficiently high S/I ratio allows the processing gain to be decreased or allows the use of a multi-level modulation system having a low degree of noise immunity, such as 16QAM, enabling high-speed data transmission. Thus, interference from another cell greatly affects the transmission data rate in the CDMA system.

The cdma2000 1xEV-DO system will be described below as an example of the CDMA system. The system performs best-effort control, and detailed specifications of the system can be obtained from non-patent document 1. The best-effort system does not serve all mobile stations uniformly but attempts to improve the radio channel efficiency, giving a high priority to a mobile station having a good channel quality. Each mobile station determines parameters of communication channel modulation and encoding in consideration of an observed degree of interference noise and reports the parameters to the base station. The base station receives the parameters and performs time-division packet scheduling in such a manner that the radio channel is preferentially allocated to a mobile station having a good condition. Therefore, a smaller amount of interference noise enables communication at a higher data rate. Minimizing the interference noise is effective in improving the system performance.

A method disclosed in Japanese Unexamined Patent Application Publication No. 2002-232350 (patent document 1) has been proposed to avoid interference between base stations in the cdma2000 1xEV-DO system (former HDR system). The proposed method uses a direction-variable antenna to narrow the aperture of the radio-wave beam transmitted by each base station and to transmit the radio waves in such a direction that strong interference will not occur.

FIG. 1 shows a radio-wave transmission pattern with a conventional technology.

The figure shows that three-sector base stations 1-1 to 1-7 transmit radio-wave beams in a common frequency band of f1. Shaded portions represent the radio-wave beams, which are transmitted in such directions that interference will not occur. The beam transmission directions are switched at predetermined times so that all directions are covered.

Patent Document 1

Japanese Unexamined Patent Application Publication No. 2002-232350

Non-patent Document

The 3rd Generation Partnership Project 2 (3GPP2) Specifications (online), The 3rd Generation Partnership Project 2 (found on Nov. 9, 2004), at http://www.3gpp2.org/public_html/specs/index.cfm/

SUMMARY OF THE INVENTION

As described with FIG. 1, interference can be reduced by providing each base-station apparatus with a direction-variable antenna. This method requires that a mobile station be in the region in which a directional beam is directed. Because each base-station apparatus independently performs packet scheduling to select a mobile station to be connected by wireless communication, it is hard to consider the beam directions in other cells. If a plurality of base stations determine the beam regions of the cells by sharing information determining the radio-wave transmission regions, it would be tough to perform real-time processing because of delay and data amounts in data transfer between the apparatuses.

Accordingly, it is an object of the present invention to provide a wireless system that can determine the region of beam transmission from each base station with high precision, in consideration of the status of each mobile station in real time, and can suppress the influence of radio interference between the base stations.

The conventional wireless communication system requires a base-station apparatus in each cell. Attention has been given to radio-on-fiber technologies, which connect a central base station and remote base stations by fiber-optic cables. The radio-on-fiber technologies use the low loss and wide band of the optical fiber. The central base station is given modulation and demodulation functions and blocks performing call processing, and is connected to the remote base stations equipped with an antenna by fiber-optic cables. The siting cost can be reduced by simplifying the remote base station, and the maintenance of the base stations can be facilitated by concentrating all facilities that require maintenance into the central base station. With this system, the regions of beams can be determined with high precision because the central base station can seize the statuses of all mobile stations in wireless communication with the remote base stations below the central base station.

The problems described above can be solved by a wireless communication system in which a central base station and a plurality of remote base stations are connected by communication media such as a fiber-optic cable, and the remote base stations perform wireless communication with a plurality of mobile stations, the remote base stations are equipped with a direction-variable antenna of which directivity varies with an electric signal supplied to a plurality of antenna elements, and the central base station performs packet scheduling of the mobile stations in such a manner that interference of radio waves sent from the remote base stations to the mobile stations can be suppressed.

The problems described above can be solved also by the wireless communication system described above in which the central base station holds electric signals to be supplied to the direction-variable antenna as a plurality of beam patterns, and the directivity is changed by switching the beam pattern as selected in accordance with the position of the mobile station.

The problems described above can be solved also by the wireless communication system described above in which each mobile station receives radio waves of all beam patterns from the remote base station and notifies the central base station of a beam received with a good quality, and the central base station determines the beam pattern to be transmitted to the mobile station accordingly.

The problems described above can be solved also by the wireless communication system described above in which the central base station estimates the position of the mobile station by predicting the direction in which radio waves come from the mobile station, and determines the beam pattern to be sent to the mobile station.

The problems described above can be solved also by the wireless communication system described above in which the central base station performs centralized management of the beam patterns to be sent to all the mobile stations.

The problems described above can be solved also by the wireless communication system described above in which the central base station holds the information of a combination of beam patterns causing interference between remote base stations and determines such a combination of mobile stations that radio waves sent from the remote base stations will not cause interference.

The problems described above can be solved also by the wireless communication system described above in which each mobile station measures radio waves sent from each remote base station, judges a beam pattern causing interference, and notifies the central base station of the beam pattern, and the central base station determines such a combination of mobile stations that radio waves sent from the remote base stations will not cause interference.

The problems described above can be solved also by the wireless communication system described above in which the beam patterns of radio waves to be checked for interference are selected in accordance with the communicating position of each mobile station, in the radio wave measurement of the mobile station.

A wireless communication system according to the present invention can suppress radio interference between base stations and can improve the efficiency of the downstream radio channel.

BRIEF DESCRIPTION OF THE DRAWINGS

FIG. 13 shows an example of a mobile-station management table.

FIG. 14 shows an example of an interference table of the first embodiment of the present invention.

FIG. 18 shows an example of an interference table of the second embodiment of the present invention.

DESCRIPTION OF THE PREFERRED EMBODIMENTS

Embodiments of the present invention will be described below with reference to the drawings, but the present invention is not limited to those embodiments.

1. First Embodiment

Figure 1:
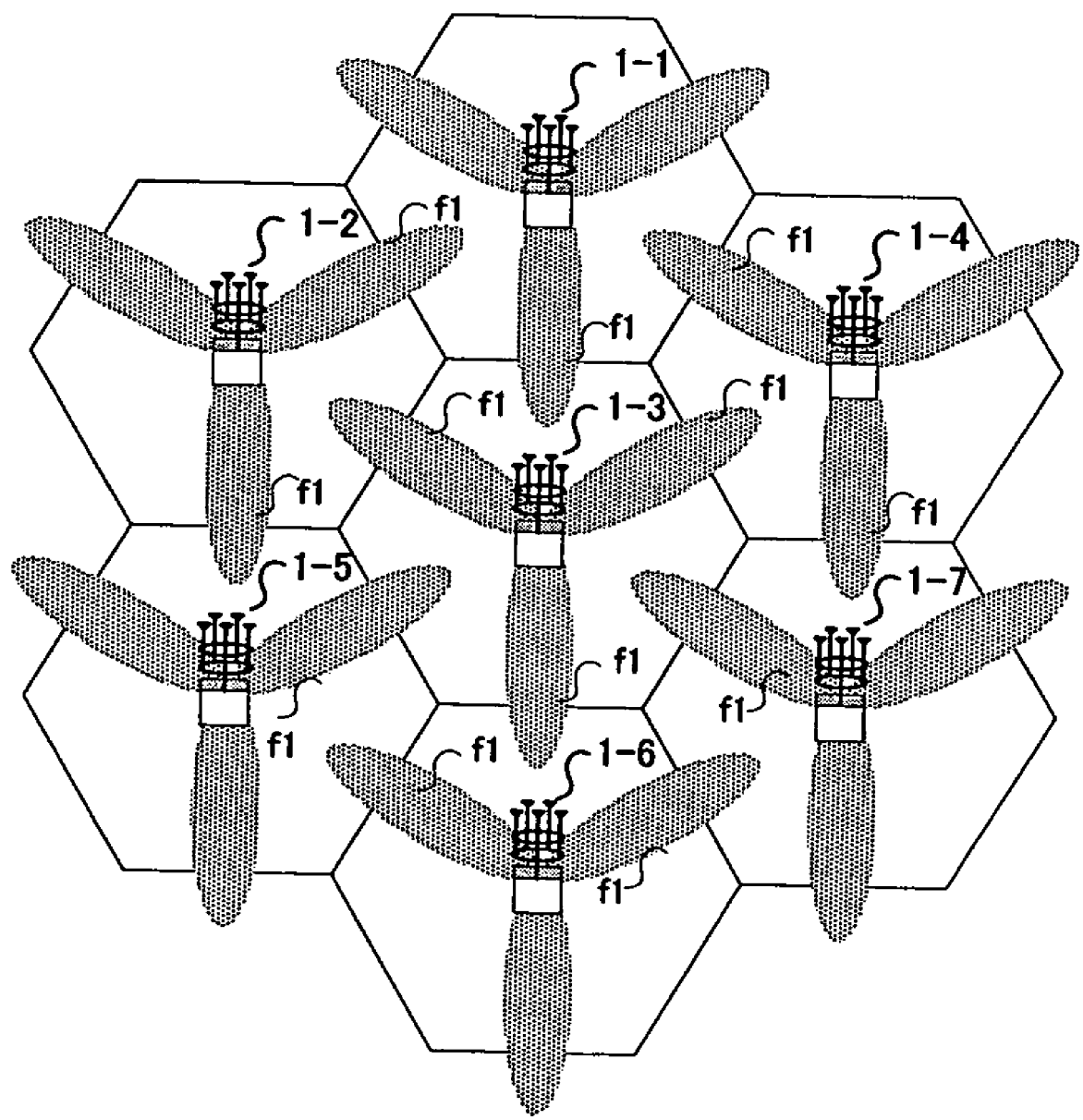
FIG. 1 shows a radio-wave transmission pattern with a conventional technology.
Figure 2:
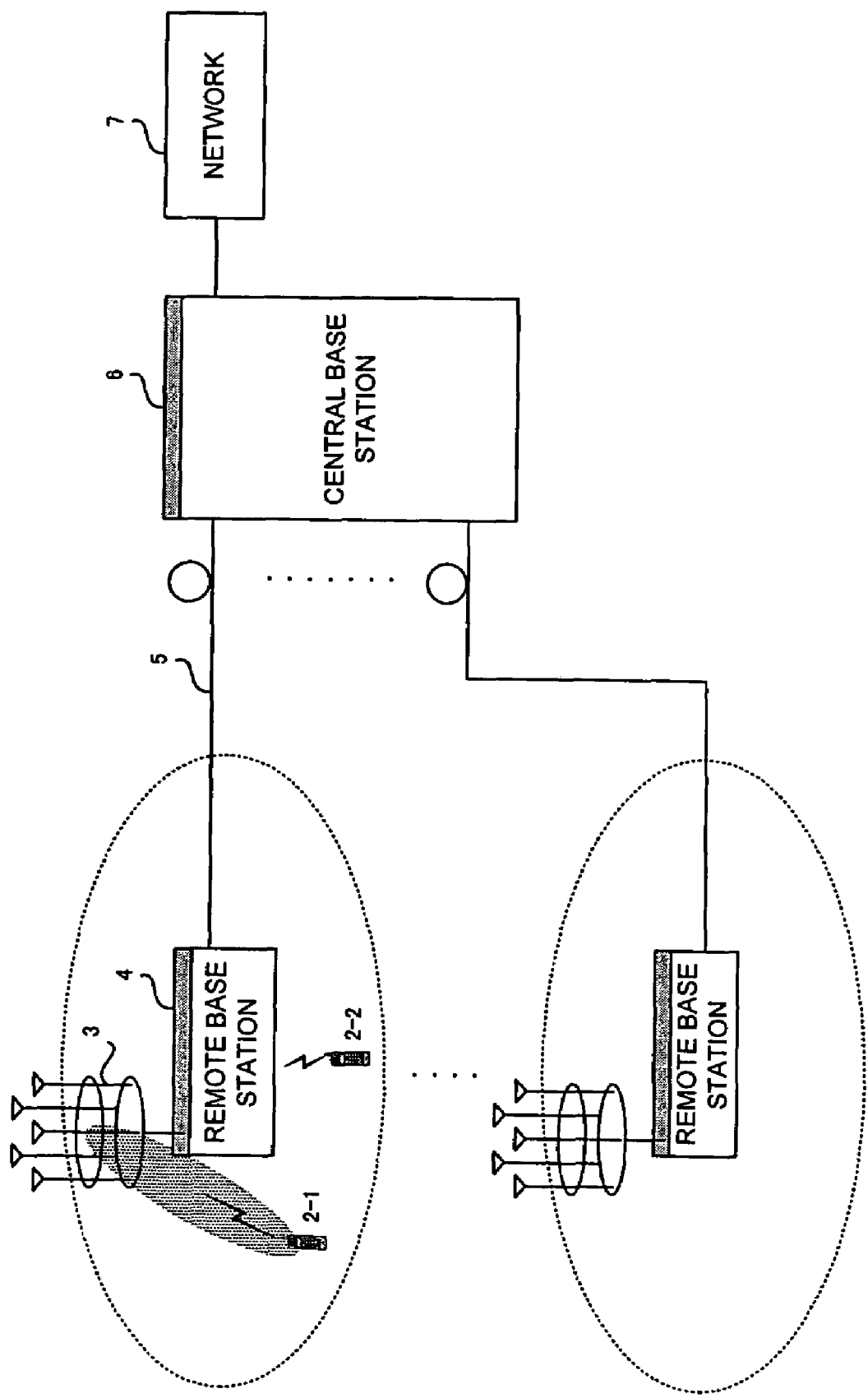
FIG. 2 shows the configuration of a first embodiment of the present invention.

FIG. 2 shows the configuration of a first embodiment of the present invention. As shown in the figure, a central base station 6 is connected to a network 7 and also to a plurality of remote base stations 4 through fiber-optic cables 5. The remote base station 4 perform wireless communication with a mobile station 2-1 selected from a plurality of mobile stations 2-1 to 2-2, by using a radio-wave beam formed by a direction-variable antenna 3.

Figure 3:
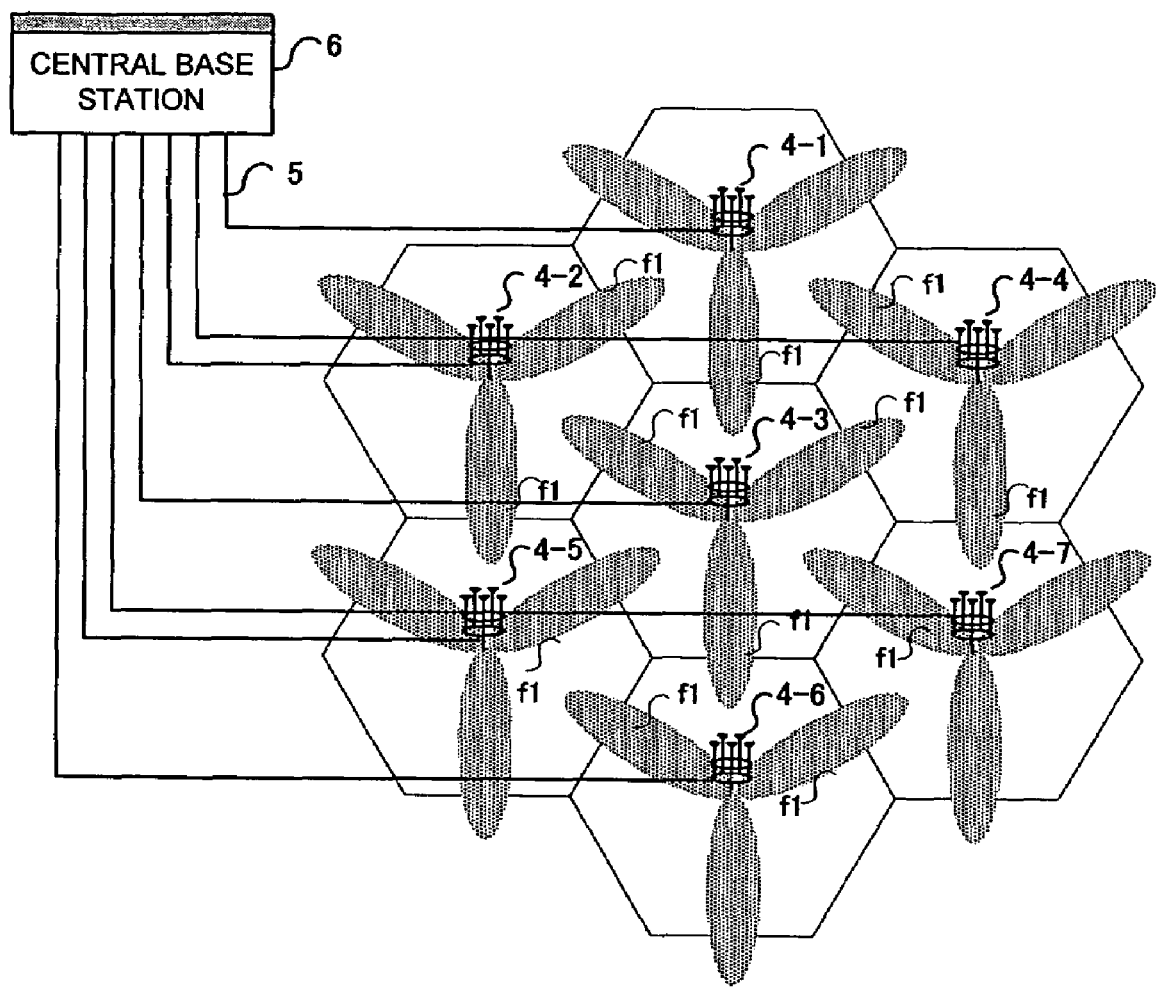
FIG. 3 shows a layout of remote base stations placed in cells according to the first embodiment of the present invention.

FIG. 3 shows a layout of remote base stations 4 placed in cells. The central base station 6 controls a plurality of remote base stations 4-1 to 4-7 so that they send narrow-aperture radio-wave beams in the same frequency band of f1 in such directions that interference will not occur. The beam transmission directions can be switched at predetermined times so that communication can be performed with the mobile stations in all directions.

Figure 4:
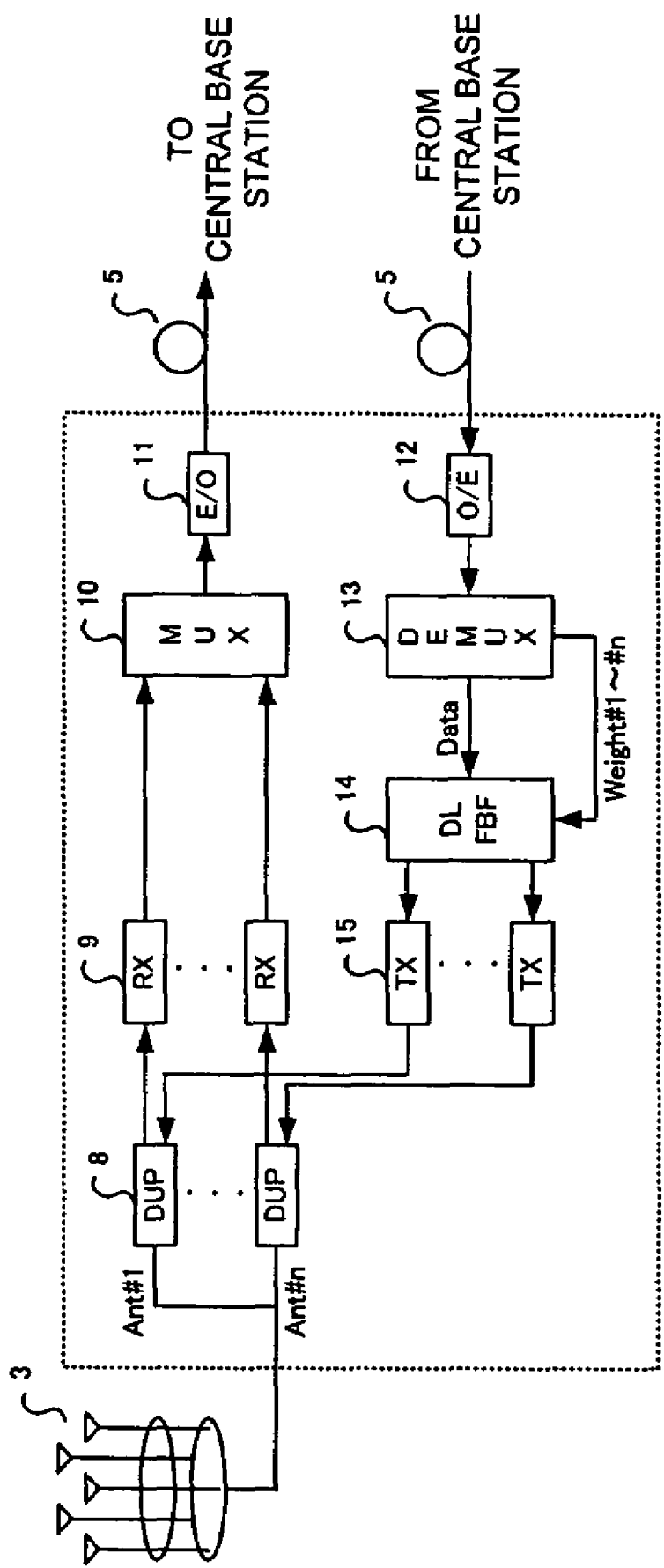
FIG. 4 shows a block diagram of the remote base station.

FIG. 4 shows a block diagram of the remote base station 4, which has the wireless control function of the conventional base station functions. The remote base station 4 includes an antenna module 3, duplexers (DUPs) 8, radio-frequency receivers (RXs) 9, a multiplexer (MUX) 10, an electric-to-optic (E/O) converter 11, fiber-optic cables 5, an optic-to-electric (O/E) converter 12, a demultiplexer (DEMUX) 13, a downstream fixed-beam forming circuit (DLFBF) 14, and radio-frequency transmitters (TXs) 15.

The upstream channel will be described first. The antenna module 3 has an antenna array which can form a highly directional beam pattern of 12 beams, for instance. The duplexer (DUP) 8 separates a transmission signal and a received signal. In a normal mobile communication system, the duplexer (DUP) 8 includes band selection filters for selecting the signals. The radio-frequency receiver (RX) 9 brings a signal from the corresponding antenna element of the antenna array to a certain level through amplification, frequency conversion, and the like, then converts the signal to a digital signal through A/D conversion. The multiplexer (MUX) 10 performs time-division multiplexing of the signal received by each antenna element and sent through the duplexer (DUP) 8 and the radio-frequency receiver (RX) 9, and converts the signal to serial data. The electric-to-optic (E/O) converter 11 converts the electric signal to an optical signal for fiber-optic transmission of the upstream signal to the central base station 6.

The downstream channel will be described next. The optic-to-electric (O/E) converter 12 converts an optical signal received from the central base station 6 to an electric signal. The demultiplexer (DEMUX) 13 separates the received signal to a main signal and array weight signals. The downstream fixed-beam forming circuit (DLFBF) 14 combines the main signal with a beam pattern having directivity in the radio-wave transmission direction as a vector.

Figure 5:
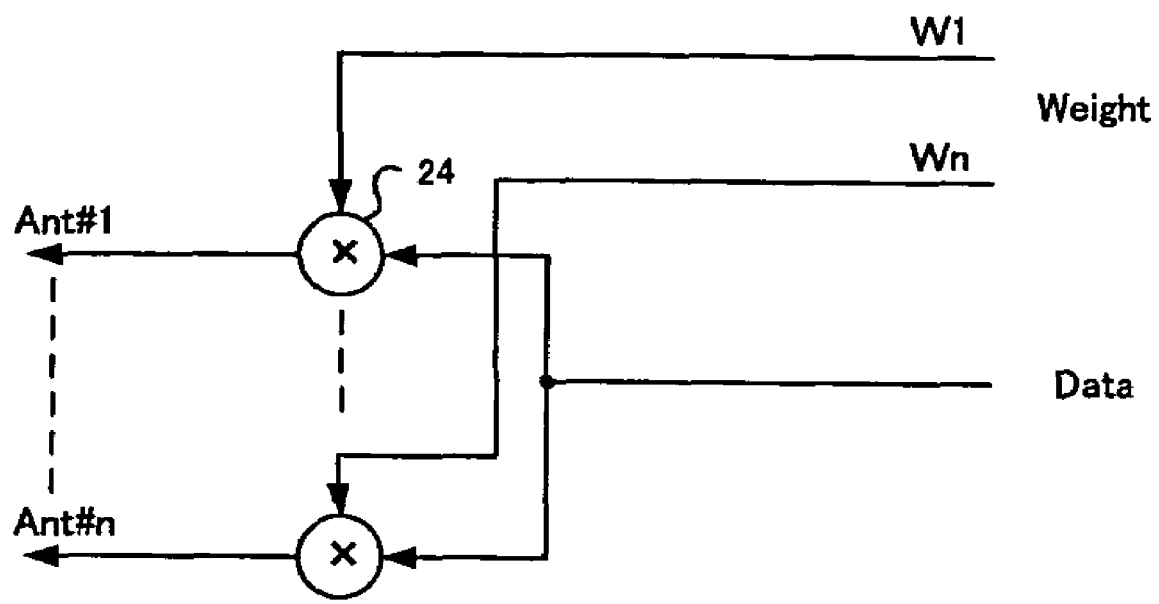
FIG. 5 shows a block diagram of a downstream fixed-beam forming circuit (DLFBF) in the remote base station.

FIG. 5 shows a block diagram of the downstream fixed-beam forming circuit (DLFBF) 14. The downstream fixed-beam forming circuit (DLFBF) 14 assigns weight vector coefficients W1 to Wn generated by the central base station 6 to the transmission signal to generate signals to be supplied to the individual antennas. Weight coefficients W1 to Wn are vector coefficients that change the amplitude and phase simultaneously.

The radio-frequency transmitter (TX) 15 performs amplification, frequency conversion, and other processing and sends a downstream signal from the antenna module 3 through the duplexer (DUP) 8.

Figure 6:
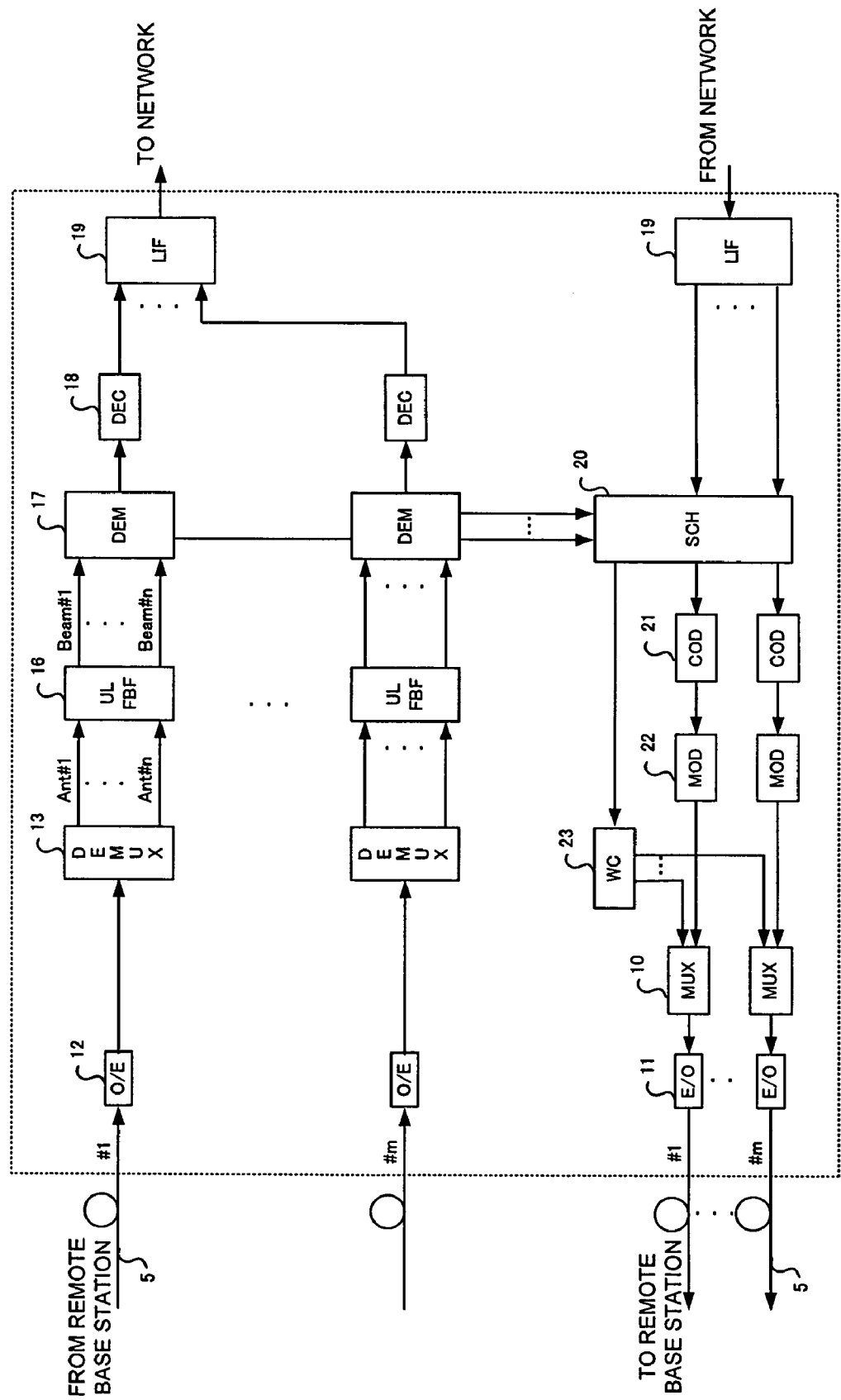
FIG. 6 shows a block diagram of a central base station.

FIG. 6 shows a block diagram of the central base station 6, which has the modulation and demodulation functions of the conventional base station functions. The central base station 6 includes optic-to-electric (O/E) converters 12, demultiplexers (DEMUXs) 13, upstream fixed-beam forming circuits (ULFBFs) 16, demodulators (DEMs) 17, decoders (DECs) 18, access line interfaces (LIFs) 19, a scheduling controller (SCH) 20, encoders (CODs) 21, modulators (MODs) 22, a weight control circuit (WC) 23, multiplexers (MUXs) 10, and electric-to-optic (E/O) converters 11.

The upstream channel will be described first. The optic-to-electric (O/E) converter 12 converts an optical signal received from the remote base station 4 to an electric signal. The demultiplexer (DEMUX) 13 separates the received signal into signals for the antenna elements. The upstream fixed-beam forming circuit (ULFBF) 16 combines the signals received by the antenna elements as vectors and provides signals having a 12-beam radiation pattern in a circumferential direction.

Figure 7:
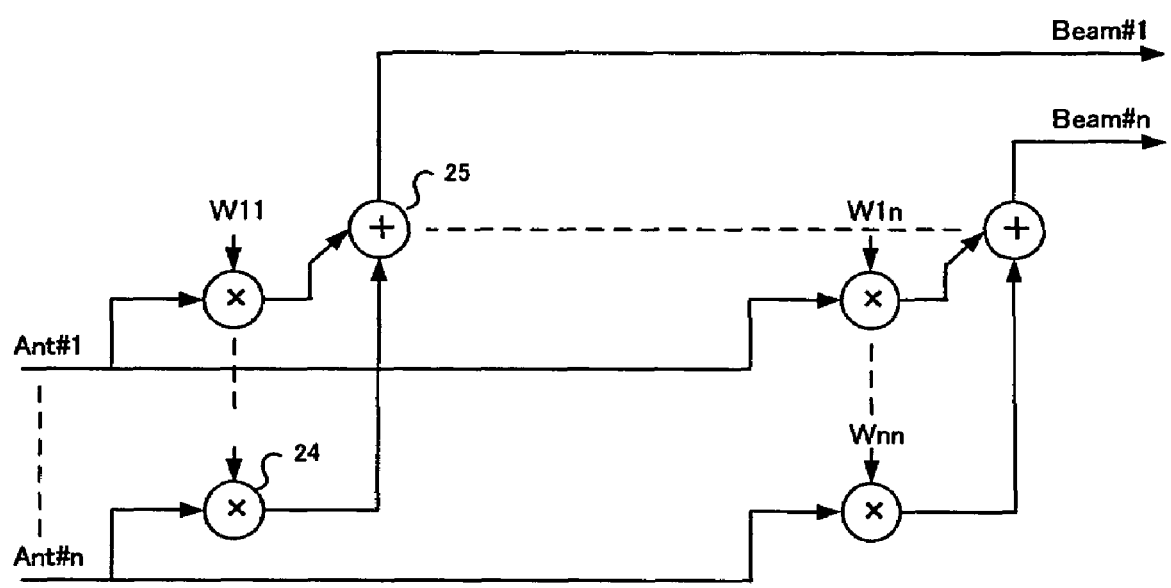
FIG. 7 shows a block diagram of an upstream fixed-beam forming circuit (ULFBF) in the central base station.

FIG. 7 shows a block diagram of the upstream fixed-beam forming circuit (ULFBF) 16. A multiplier 24 assigns appropriate weights to the signals for the antenna elements, an adder 25 adds the signals, and a narrow-aperture beam is provided. Vector coefficients are used as weight coefficients W11 to Wnn so that the amplitude and phase are changed simultaneously.

The demodulator (DEM) 17 demodulates the received signals.

Figure 8:
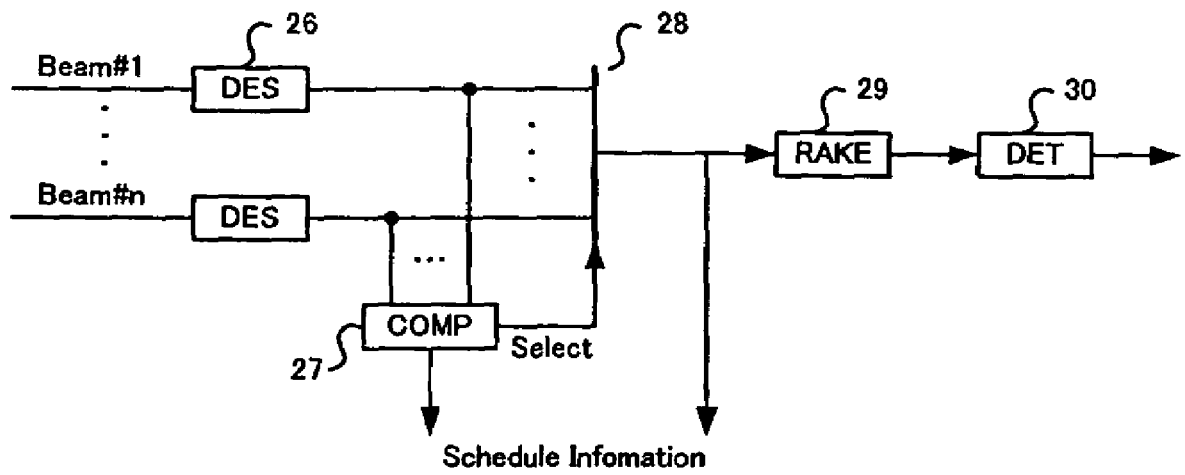
FIG. 8 shows a block diagram of a demodulator (DEM) in the central base station.

FIG. 8 shows a block diagram of the demodulator (DEM) 17. A channel separator (DES) 26 such as a despreading circuit separates a signal sent from a desired mobile station, from the received beam signals. Then, a comparator (COMP) 27 compares the beam signals, and an optimum beam signal selected by a selector 28 is added for multiple paths by a rake combination circuit (RAKE) 29, and is demodulated by a demodulator (DET) 30.

The decoder (DEC) 18 performs error-correcting decoding and sends the signal to a wired communication network via the access line interface (LIF) 19.

The downstream channel will be described next. The access line interface (LIF) 19 receives a signal from the wired communication network. The scheduling controller (SCH) 20 selects a mobile station to be connected by wireless communication.

Figure 9:
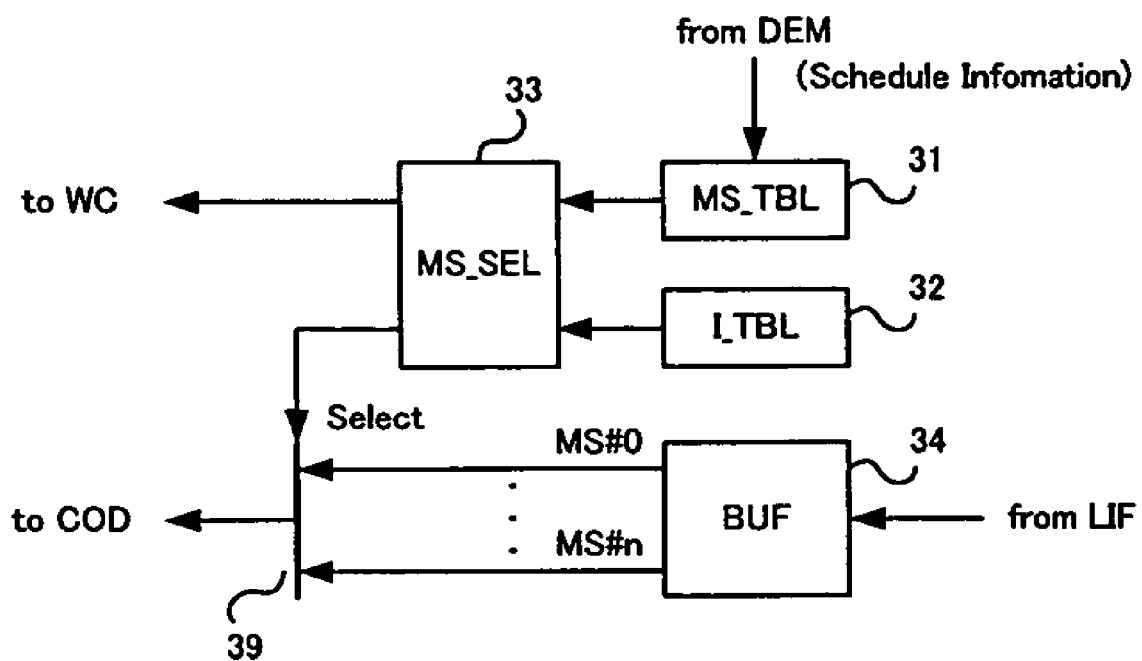
FIG. 9 shows a block diagram of a scheduling controller (SCH) in the central base station.

FIG. 9 shows a block diagram of the scheduling controller (SCH) 20. An operation block 38 of the scheduling controller (SCH) 20 calculates the base station ID, area ID, and transmission priority level of each mobile station, on the basis of the beam information, required data rate, and other schedule information of each mobile station received from the demodulator (DEM) 17, and stores the calculated items in a mobile-station management table (MS_TBL) 31. The base station ID and area ID represent the current location of the mobile station and correspond to an area in which a narrow-aperture beam is sent in wireless communication. The transmission priority level is calculated from the required data rate, transmission throughput, and the like, in a best effort manner. An interference evaluation table (I_TBL) 32 stores information indicating with which area of a remote base station a certain remote base station can cause strong interference. This table is specified beforehand in consideration of the transmission beam shape. A mobile station selection circuit (MS_SEL) 33 references the mobile-station management table (MS_TBL) 31 and the interference evaluation table (I_TBL) 32, and selects mobile stations so that the beams can be transmitted without causing strong interference. A data buffer (BUF) 34 holds data to be sent to each mobile station. Data of the mobile station selected by a selector 39 is sent to the encoder (COD) 21. The transmission area information of the selected mobile station is sent to the weight control circuit (WC) 23.

The encoder (COD) 21 performs error-correcting encoding. The modulator (MOD) 22 performs modulation of a certain method. The weight control circuit (WC) 23 selects a weight coefficient to be used as a multiplier of each antenna array for forming the beam to be transmitted to the selected mobile station 2. The weight pattern of each area is specified in a table beforehand and is selected in accordance with the transmission area information given by the scheduling controller (SCH) 20. The multiplexer (MUX) 10 multiplies the modulated signal with the array weight signal. The electric-to-optic (E/O) converter 11 converts the electric downstream signal to an optical signal for fiber-optic transmission to the remote base station 4.

Figure 10:
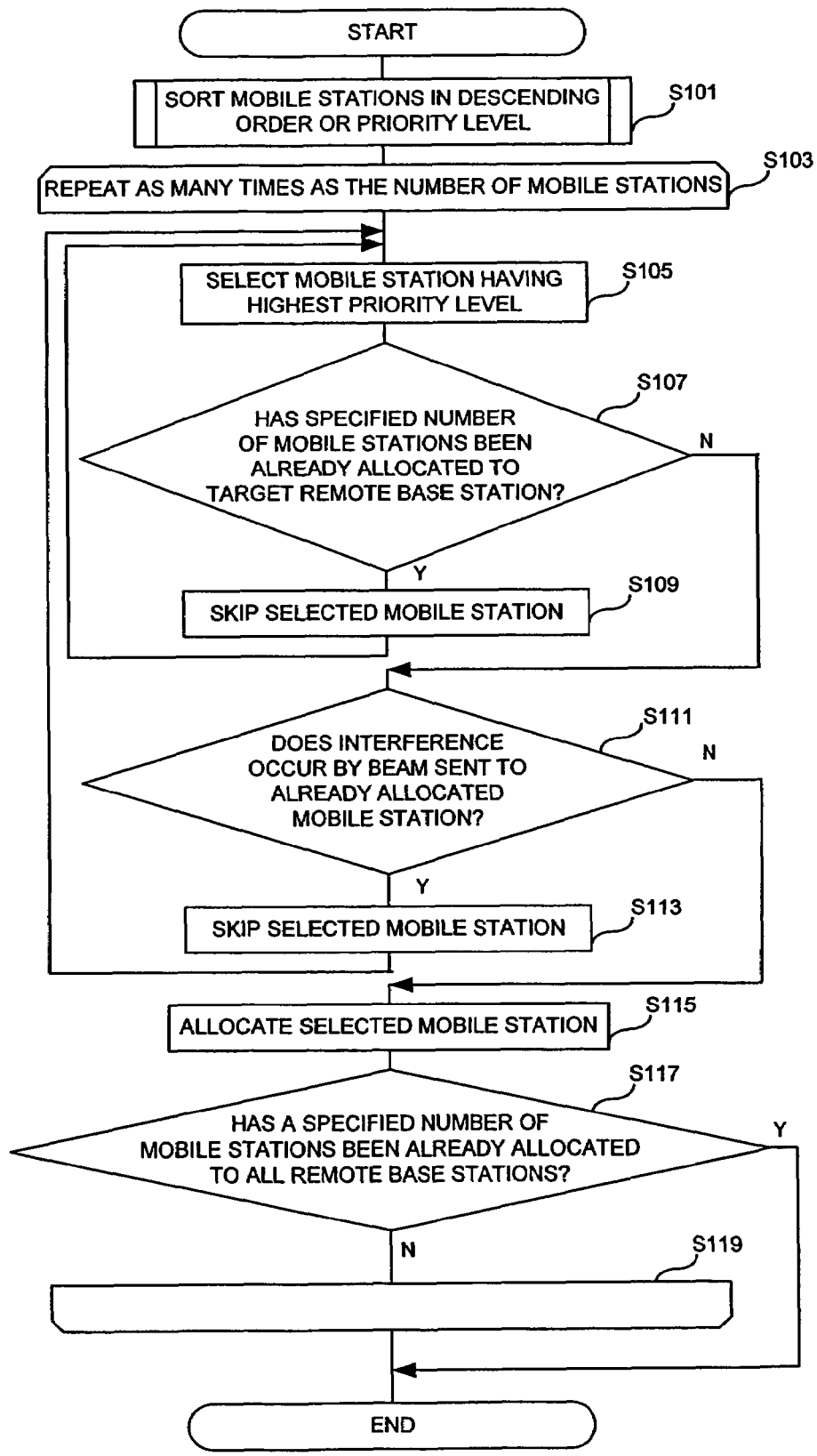
FIG. 10 shows a flow chart for scheduling algorithm.

FIG. 10 shows an algorithm for mobile station scheduling. An appropriate processing block or the mobile station selection circuit (MS_SEL) 33 in the scheduling controller (SCH) 20 executes this algorithm, by using the two tables mentioned above. First, the mobile-station management table (MS_TBL) 31 is sorted in descending order of priority levels assigned to the mobile stations (S101). One mobile station having the highest priority level is selected (S105). The remote base station to communicate with the selected mobile station is checked to see whether a specified number of mobile stations has already been allocated (S107). If yes, the selected mobile station cannot be allocated additionally. So, the mobile station is not allocated (S109), and a next mobile station is selected (S105). If the specified number of mobile stations has not yet been allocated, the selected mobile station is kept as a candidate mobile station that can be allocated, and an interference check (S111) is carried out. In the interference check step (S111), it is checked whether the beam to be sent to the candidate mobile station and the beam to be sent to an allocated mobile station will cause strong interference, in accordance with the interference evaluation table (I_TBL) 32. If it is determined that interference will occur, the allocated terminal takes precedence over the candidate mobile station, and the candidate mobile station is not allocated (S113). A next mobile station is selected (S105). If it is determined that no interference will occur, the candidate mobile station is allocated (S115). It is checked whether all the remote base stations already have a specified number of mobile stations (S117). If not, a next mobile station is selected, and the scheduling steps (S103 to S119) are repeated. If the specified number of mobile stations has been allocated, scheduling is finished. When all the mobile stations are evaluated, scheduling ends even if the specified number of mobile stations has not yet been allocated.

Figure 11:
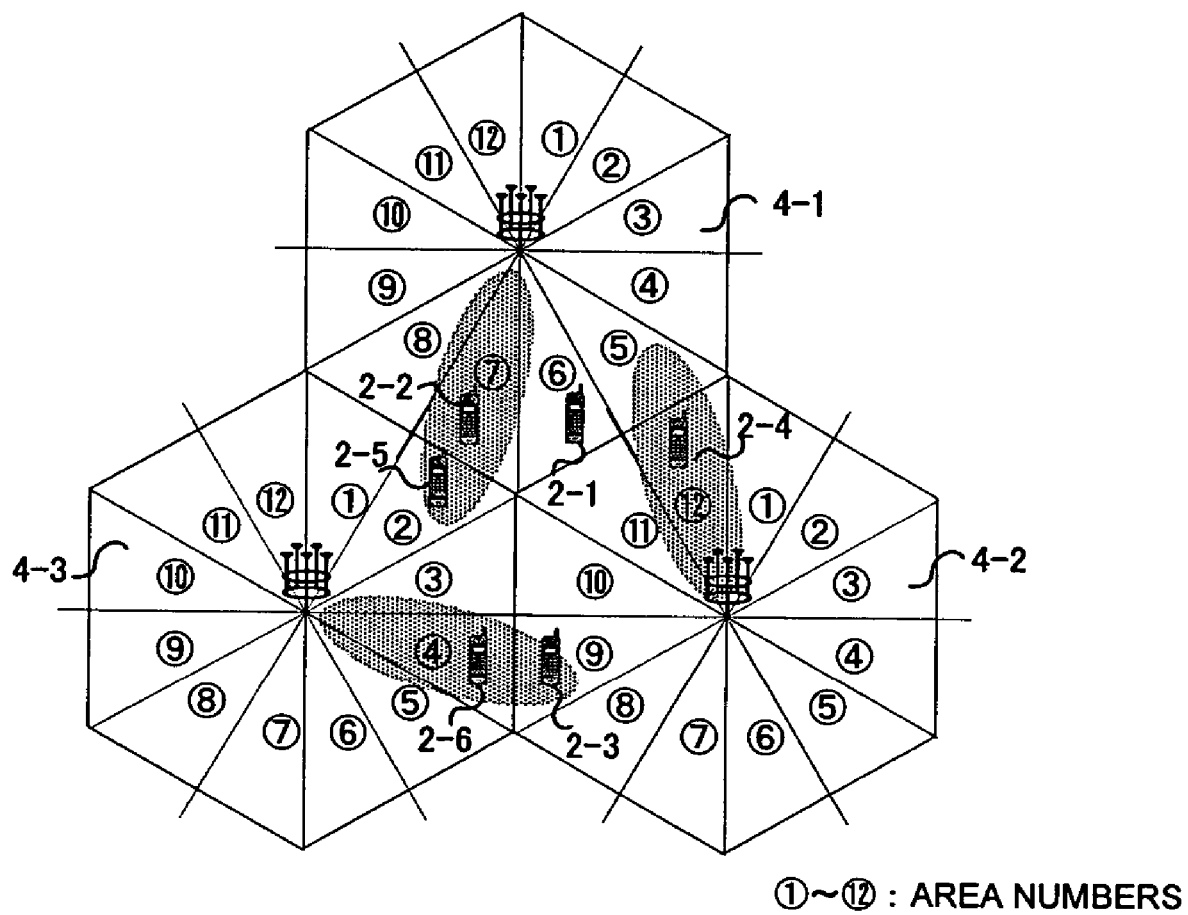
FIG. 11 shows a beam transmission pattern.

FIG. 11 shows an example beam transmission pattern.

Mobile station scheduling will be described in further detail with reference to a mobile station layout shown in FIG. 11.

Figure 12:
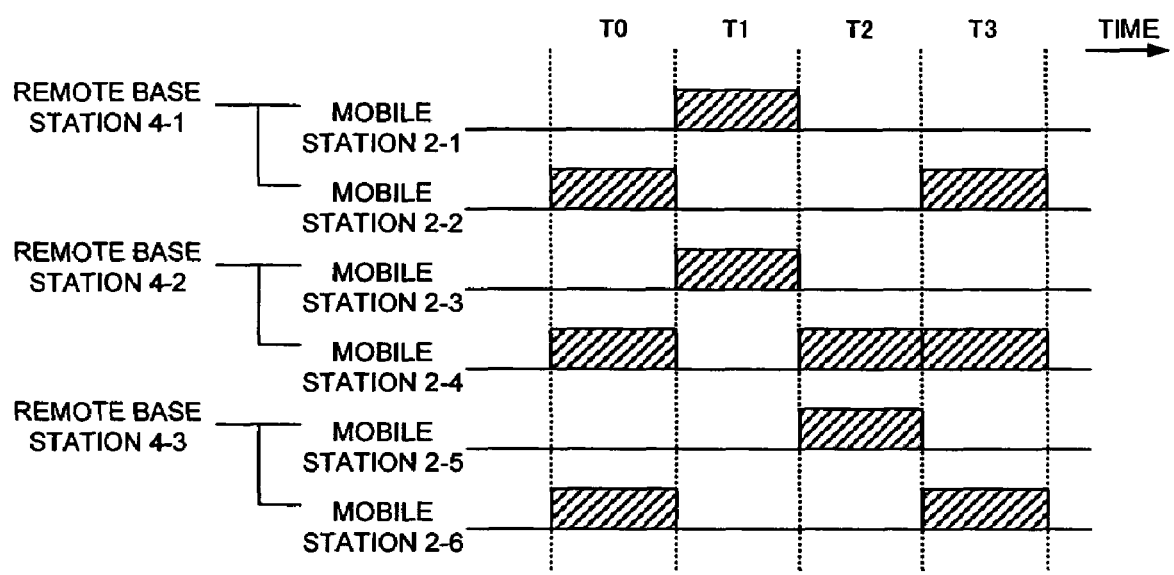
FIG. 12 shows an example of packet scheduling of the mobile stations.

FIG. 12 shows a result of scheduling. In the figure, T0 to T3 represent time slots of data transmission, and shaded slots indicate selected mobile stations. As the priority levels of the mobile stations and the interference status vary with time, the selected mobile stations are switched.

FIG. 13 shows an example of the mobile-station management table (MS_TBL) 31 at time T0, and FIG. 14 shows an example of the interference evaluation table (I_TBL) 32. The mobile-station management table (MS_TBL) 31 lists the areas containing the mobile stations 2-1 to 2-6 and the priority levels. The interference evaluation table (I_TBL) 32 lists areas where beam transmission can cause interference with each area of each remote base station. For instance, area <6> of base station 4-1 can cause strong interference with areas <11> and <12> of base station 4-2 and area <2> of base station 4-3, so that these areas are stored in the interference table. (The numbers in the angle brackets corresponds to the circled area numbers in the drawings.)

Figure 15:
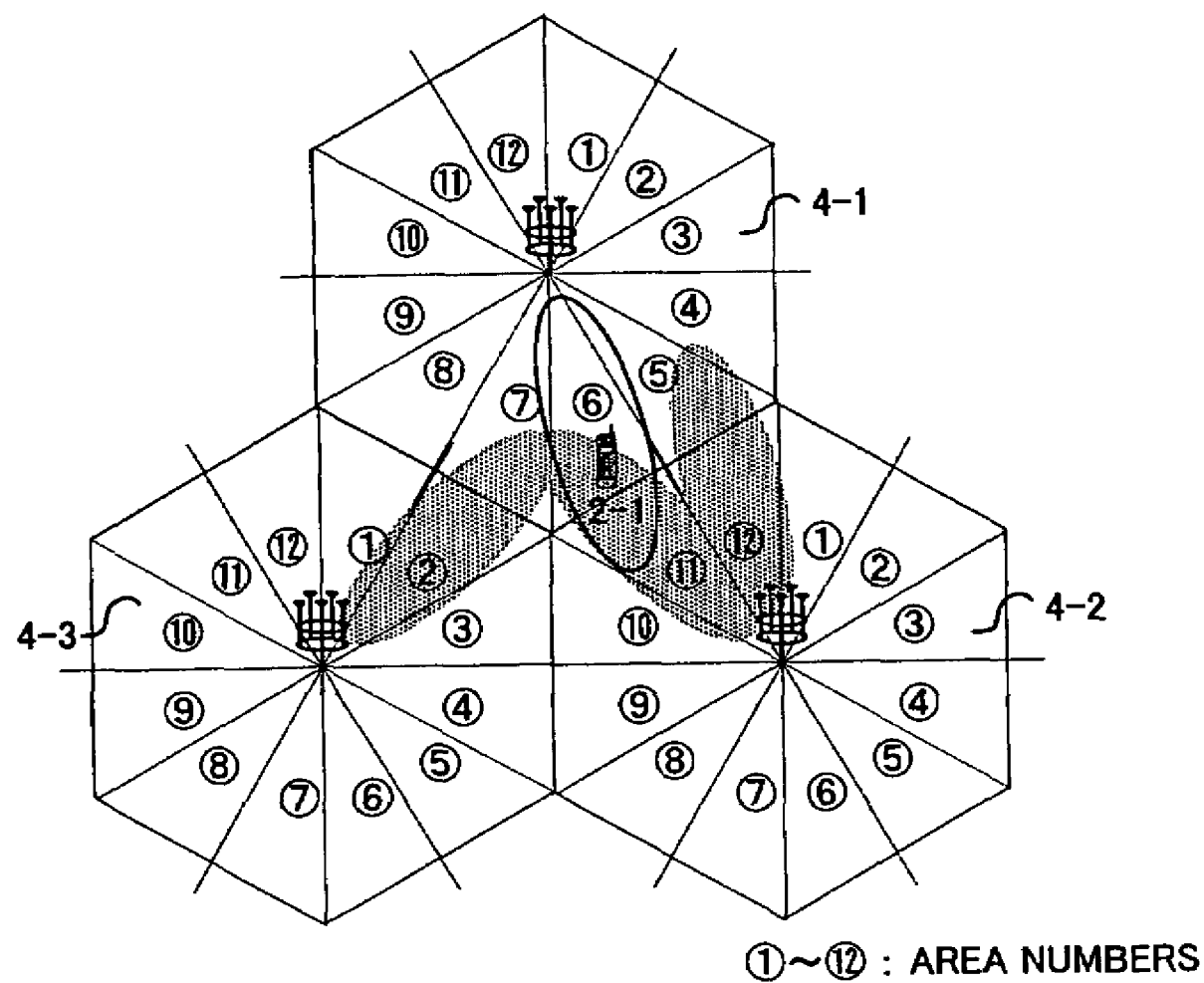
FIG. 15 shows one example of interference areas.

FIG. 15 shows the interference status in the above example case. Strong interference can occur in shaded portions.

The scheduling operation at time T0 will be described with reference to the algorithm shown in FIG. 10. It is supposed here that the allocation count of each remote base station is predetermined to 1. When the mobile stations to be scheduled are sorted in descending order of priority level, the ranking of mobile stations, from highest to lowest, is 2-2, 2-5, 2-6, 2-1, 2-3, and 2-4. Mobile station 2-2 having the highest priority level is selected as a first candidate mobile station. Because no mobile station has been allocated to remote base station 4-1, mobile station 2-2 is allocated to the remote base station. Mobile station 2-5 is selected next. No mobile station has been allocated to remote base station 4-3, but area <2> thereof will cause interference with area <7> of base station 4-1, containing allocated mobile station 2-2. Accordingly, mobile station 2-5 is not allocated. Then, mobile station 2-6 is selected. No mobile station has been allocated to remote base station 4-3, and area <4> of remote base station 4-3 will not cause interference with area <7> of base station 4-1, containing allocated mobile station 2-2. Accordingly, mobile station 2-6 is allocated to remote base station 4-3. Mobile station 2-1 is selected next. Because mobile station 2-2 has been allocated to remote base station 4-1, mobile station 2-1 is not allocated. Then, mobile station 2-3 is selected. No mobile station has been allocated to remote base station 4-2, but area <9> of remote base station 4-2 will cause interference with area <4> of base station 4-3, containing allocated mobile station 2-6. Accordingly, mobile station 2-3 is not allocated. Mobile station 2-4 is selected next. No mobile station is allocated to remote base station 4-2, and area <12> of remote base station 4-2 will not cause interference with the areas including allocated mobile stations 2-2 and 2-6. Accordingly, mobile station 2-4 is allocated to remote base station 4-2. Now, all the base stations have allocated mobile stations, and scheduling is completed. As a result of scheduling, packet scheduling to the mobile stations can be determined in such a manner that strong interference will not be caused by beams transmitted among the remote base stations.

If any of the mobile stations moves to a different area, the mobile station management table is updated as described below.

Figure 16:
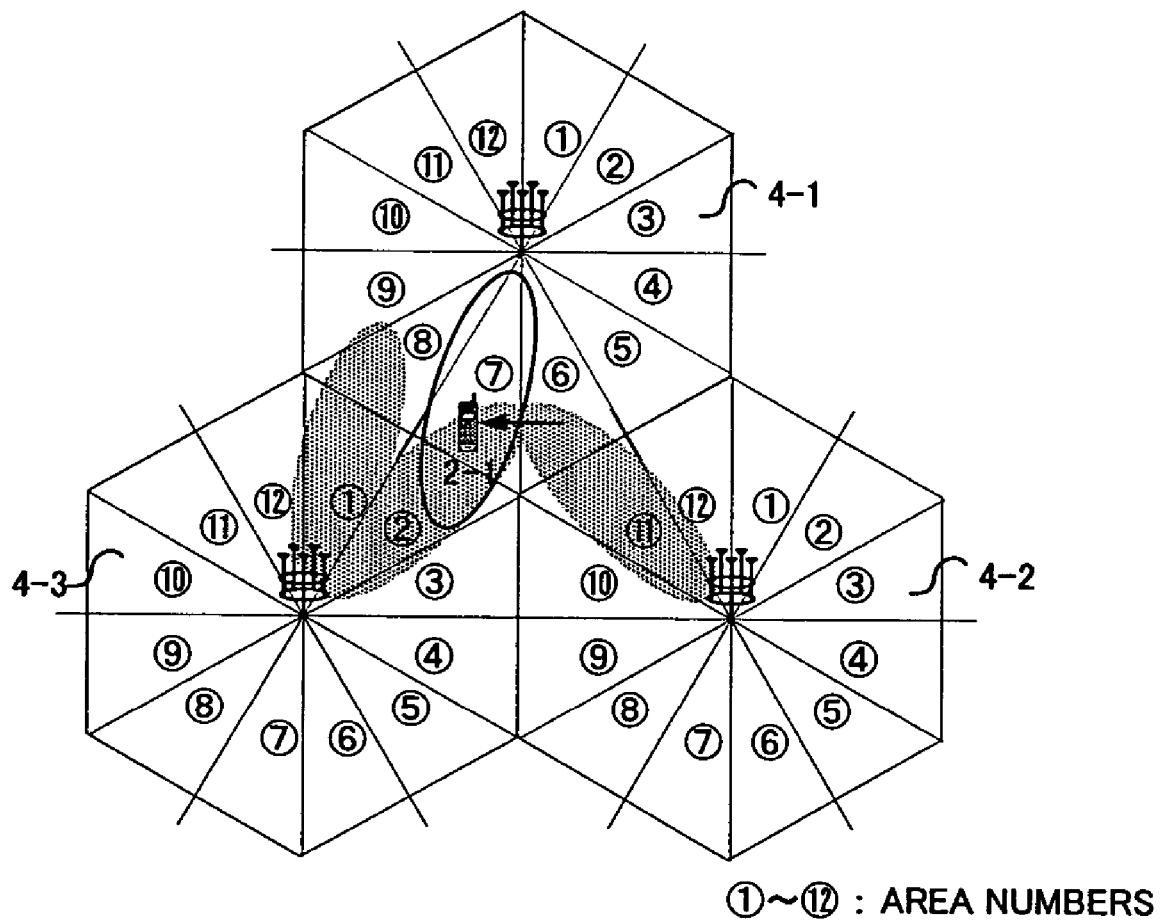
FIG. 16 shows a movement of a mobile station in the first embodiment.

FIG. 16 shows a movement of a mobile station to a different area in the present embodiment. If mobile station 2-1 moves from area <6> of remote base station 4-1, as shown in FIG. 15, to area <7> of remote base station 4-1, as shown in FIG. 16, the signal from mobile station 2-1 received in area <7> and demodulated by the demodulator (DEM) 17 of the central base station 6 has the highest intensity. The demodulator (DEM) 17 notifies the scheduling controller (SCH) 20 that mobile station 2-1 is in area <7> of remote base station 4-1. The scheduling controller (SCH) 20 updates the positional information in the mobile station management table (MS_TBL) accordingly, and performs subsequent scheduling in accordance with the updated table. This system monitors the positions of mobile stations in real time and can control the beams transmitted from the remote base stations so that strong interference will not occur.

2. Second Embodiment

Another embodiment of the present invention will be described. The second embodiment differs from the first embodiment in that the central base station performs scheduling on the basis of information calculated by a mobile station. More specifically, the mobile station generates area information for the mobile station management table and also generates interference evaluation information. This enables a table to be created in accordance with the quality of radio waves received by the mobile station and thus enables the precision of scheduling for avoiding interference to be improved. The mobile station calculates the information by using a pilot signal sent by the remote base station periodically in each area.

Figure 17:
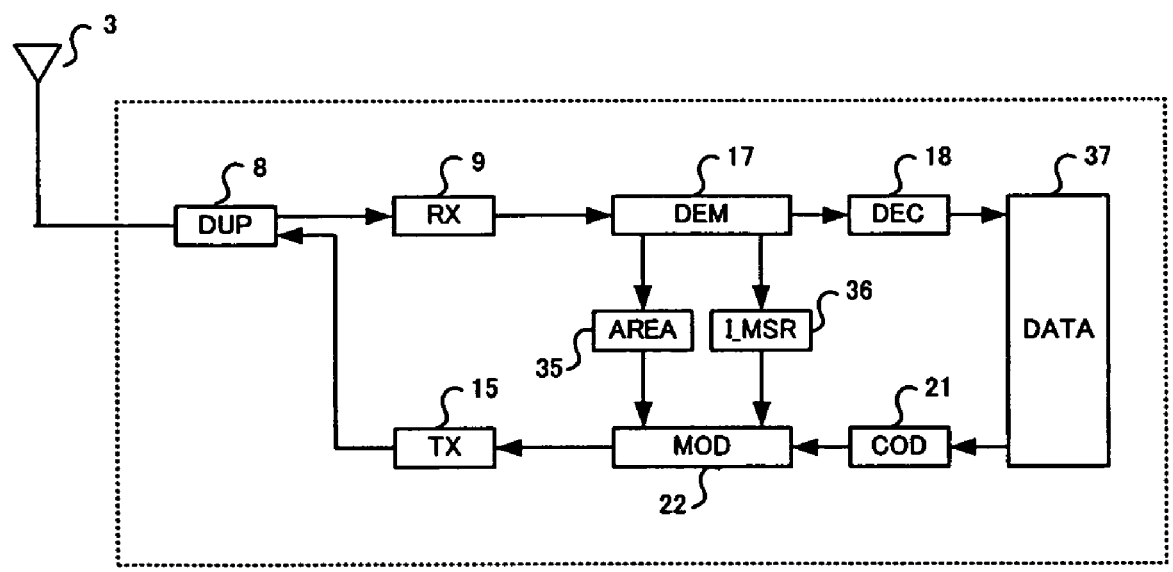
FIG. 17 shows a block diagram of a mobile station of a second embodiment of the present invention.

FIG. 17 shows a block diagram of a mobile station of the second embodiment. The mobile station includes an antenna module 3, a duplexer (DUP) 8, a radio-frequency receiver (RX) 9, a demodulator (DEM) 17, a decoder (DEC) 18, an encoder (COD) 21, a modulator (MOD) 22, a radio-frequency transmitter (TX) 15, an area measurement circuit (AREA) 35, an interference measurement circuit (I_MSR) 36, and a data processing block (DATA) 37.

The downstream channel will be described first. The antenna module 3 includes an antenna which can receive a signal in every direction, like an omni antenna. The duplexer (DUP) 8 separates a transmission signal and a received signal. The radio-frequency receiver (RX) 9 brings the received signal to a certain level through amplification, frequency conversion, and the like, then converts the signal to a digital signal through A/D conversion. The demodulator (DEM) 17 demodulates the received signal. The demodulator (DEM) 17 also calculates S/I of the pilot signal sent to each area of the remote base station and notifies the calculated result to the area measurement circuit (AREA) 35 and the interference measurement circuit (I_MSR) 36. The decoder (DEC) 18 performs error-correcting decoding of the demodulated signal and sends the resultant signal to the data processing block (DATA) 37. The area measurement circuit (AREA) 35 selects an area of the best reception quality in accordance with the S/I information of the pilot signal of each area received from the demodulator (DEM) 17, and sends the selection result as area information to the modulator (MOD) 22. The interference measurement circuit (I_MSR) 36 checks whether S/I of the pilot signal of the area received from the demodulator (DEM) 17 reaches a certain threshold level, if so, judges the area as being an interference area, and notifies the modulator (MOD) of the judgment.

The upstream channel will be described next. The data processing block (DATA) 37 sends a signal, and the encoder (COD) 21 performs error-correcting encoding of the signal. The modulator (MOD) 22 receives the signal transmitted from the data processing block (DATA) 37, area information from the area measurement circuit (AREA) 35, and interference information from the interference measurement circuit (I_MSR) 36, and performs modulation of a certain method. The radio-frequency transmitter (TX) 15 performs amplification, frequency conversion, and other processing, and sends an upstream signal from the antenna module 3 through the duplexer (DUP) 8.

The demodulator (DEM) 17 of the central base station 6 demodulates the area information and interference information sent from the mobile station, and sends the result to the scheduling controller (SCH) 20, which includes a setting block for setting a table and other means (not shown). The scheduling controller (SCH) 20 stores the area information in the mobile-station management table (MS_TBL) 31 and the interference information in the interference evaluation table (I_TBL) 32.

FIG. 18 shows an example of the interference table of the second embodiment. The table stores information indicating in which area of which remote base station the beam from each mobile station causes interference. In the shown table, mobile station 2-1 has found that strong interference occurs only by the beam sent to area <11> of base station 4-2. The central base station 6 performs scheduling in accordance with the mobile-station management table (MS_TBL) 31 and the interference evaluation table (I_TBL) 32, as in the first embodiment.

Supposing that the mobile stations are placed as shown in FIG. 11, scheduling of the second embodiment will be compared with scheduling of the first embodiment. As shown in FIG. 14, mobile station 2-1 in area <6> of base station 4-1 considers areas <11> and <12> of base station 4-2 and area <2> of base station 4-3 to be strong interference areas, in the first embodiment. In the second embodiment, radio waves transmitted to just area <11> of base station 4-2 are considered to cause strong interference at mobile station 2-1. In the first embodiment, mobile station 2-1 cannot be simultaneously scheduled with a mobile station in area <12> of base station 4-2 or in area <2> of base station 4-3 although strong interference does not actually occur. In the second embodiment, mobile station 2-1 can be simultaneously scheduled with the mobile station in area <12> of base station 2-4 or in area <2> of base station 4-3. This means that the accuracy of evaluation information is improved by using the interference status measured by the mobile station. According to the second embodiment, the system can control the beams transmitted from the remote base stations while monitoring the interference status of the mobile stations in real time.

According to the present invention, the wireless communication system can suppress radio interference between base stations and can improve the efficiency of the downstream radio channel.

What is claimed is:

1. A wireless communication system comprising:
   a plurality of remote base stations for transmitting and receiving wireless signal with a plurality of mobile stations;
   a central base station connected with the plurality of remote base stations, for transmitting signals from the plurality of mobile stations through the plurality of remote base stations to a network side and receiving signals for the plurality of mobile stations from the network side, and performing scheduling of transmitting signals to the plurality of mobile stations;
   wherein
   each of the plurality of the remote base stations comprising
   a direction-variable antenna of which directivity varies with an electric signal supplied to a plurality of antenna elements; and
   the central base station comprising:
   a mobile-stations management table which stores an identification and an area information of a remote base station in which each mobile station is placed, and the allocation priority level of the mobile station to communication, for all of the plurality of remote base stations connected with the central base station;
   an interference evaluation table which stores a plurality of area informations causing interference with a certain area of a certain remote base station corresponding to each area of a remote base station, for all of the plurality of remote base stations connected with the central base stations; and
   a scheduling controller for referencing the interference evaluation table in accordance with allocation priority information of each of the mobile stations stored in the mobile-station assignment table, and performing scheduling of transmitting signal to each of the mobile stations so that interference of radio waves sent from each of the remote base stations to each of the mobile stations can be suppressed,
   a weight control unit for selecting a weight coefficient to be given to the direction-variable antenna of each of the plurality of remote base stations, based on information from the scheduling controller, so that the corresponding remote base station forms beam according to scheduling result,
   wherein the plurality of remote base stations and the central base station have an optic-to-electric converter and an electric-to-optic converter, in which the central base station and the plurality of remote base stations are connected by a fiber-optic cable, and signal from each of the plurality of mobile stations and the weight coefficient transmitted from the central base station to the plurality of remote base stations are transmitted or received through the fiber-optic cable, so as to determine directionality of the direction-variable antenna by the scheduling result in real time and control interference between the plurality of mobile base stations.

2. A wireless communication system according to claim 1, wherein the central base station holds electric signals to be supplied to the direction-variable antenna as a plurality of beam patterns, and the directivity is changed by switching the beam pattern as selected in accordance with the position of the mobile station.

3. A wireless communication system according to claim 2, wherein the central base station estimates the position of the mobile station by predicting the direction in which radio waves come from the mobile station, and determines the beam pattern to be sent to the mobile station.

4. A wireless communication system according to claim 3, wherein the central base station performs centralized management of the beam patterns to be sent to all the mobile stations.

5. A wireless communication system according to claim 2, wherein each mobile station receives radio waves of all beam patterns from the remote base stations and notifies the central base station of a beam received with good quality, and the central base station determines the beam pattern to be sent to the mobile station.

6. A wireless communication system according to claim 5, wherein the central base station performs centralized management of the beam patterns to be sent to all the mobile stations.

7. A wireless communication system according to claim 1, wherein the scheduling controller selects such a mobile station that a transmitted beam will not cause strong interference, in accordance with the priority levels of the mobile stations stored in the mobile-station management table and with reference to the interference evaluation table; and a combination of mobile stations are determined so that interference will not occur between radio waves sent by the remote base stations.

8. A wireless communication system according to claim 1, wherein each mobile station measures radio waves sent from the remote base station, determines a beam pattern causing interference, and notifies the central base station of interference area information; and the central base station specifies the interference evaluation table, in accordance with the notified interference area information, and determines such a combination of mobile stations that radio waves sent from the remote base stations will not cause interference, in accordance with the specified combination information.

9. A wireless communication system according to claim 8, wherein beam patterns of radio waves to be checked for interference are selected in accordance with the communicating position of each mobile station, in the radio wave measurement of the mobile station.

* * * * *